(12) United States Patent
Acharya

(10) Patent No.: US 6,366,692 B1
(45) Date of Patent: *Apr. 2, 2002

(54) MEDIAN COMPUTATION-BASED INTEGRATED COLOR INTERPOLATION AND COLOR SPACE CONVERSION METHODOLOGY FROM 8-BIT BAYER PATTERN RGB COLOR SPACE TO 24-BIT CIE XYZ COLOR SPACE

(75) Inventor: Tinku Acharya, Tempe, AZ (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/050,743

(22) Filed: Mar. 30, 1998

(51) Int. Cl.$^7$ ................................................ G06K 9/00
(52) U.S. Cl. ........................ 382/162; 382/167; 382/300; 358/518; 358/525
(58) Field of Search ............................... 382/167, 168, 382/236, 232, 162, 300; 348/650, 272–273, 276, 242, 577, 651, 97, 362, 104, 391.1; 345/431, 138, 153–154, 589, 600–605; 358/518–525, 500

(56) References Cited

U.S. PATENT DOCUMENTS

| | | | | |
|---|---|---|---|---|
| 3,971,065 A | * | 7/1976 | Bayer | 348/276 |
| 4,189,743 A | * | 2/1980 | Schure | 348/577 |
| 4,189,744 A | * | 2/1980 | Stern | 348/577 |
| 4,630,307 A | * | 12/1986 | Cok | 382/165 |
| 4,642,678 A | * | 2/1987 | Cok | 348/242 |
| 4,763,186 A | * | 8/1988 | Belmares-Sarabia | 348/650 |
| 5,065,229 A | * | 11/1991 | Tsai | 348/391.1 |
| 5,237,402 A | * | 8/1993 | Deshon et al. | 358/520 |
| 5,305,094 A | * | 4/1994 | Belmares-Sarabia | 348/651 |
| 5,382,976 A | * | 1/1995 | Hibbard | 348/273 |
| 5,398,121 A | * | 3/1995 | Kowalewski et al. | 358/504 |
| 5,457,491 A | * | 10/1995 | Mowry | 348/104 |
| 5,477,345 A | * | 12/1995 | Tse | 358/500 |
| 5,506,619 A | * | 4/1996 | Adams, Jr. et al. | 348/272 |
| 5,509,086 A | * | 4/1996 | Edgar | 382/167 |
| 5,602,654 A | * | 2/1997 | Patti et al. | 358/461 |
| 5,652,621 A | * | 7/1997 | Adams, Jr. et al. | 348/272 |
| 5,805,217 A | * | 9/1998 | Lu et al. | 348/273 |
| 5,874,988 A | * | 2/1999 | Gu | 348/97 |
| 5,889,554 A | * | 3/1999 | Mutze | 348/273 |
| 5,920,831 A | * | 7/1999 | Pringle | 702/127 |
| 5,969,761 A | * | 10/1999 | Takahashi | 348/362 |
| 5,990,950 A | * | 11/1999 | Addison | 348/273 |

OTHER PUBLICATIONS

"Interactions Between Color Plane Interpolation and Other Image Processing Functions in Electronic Photgraphy," James E. Adams, Jr., SPIE (The International Society for Optical Engineering), vol. 2416 (Electronic Imaging '95), pp. 144–155 (Jul. 1995).

\* cited by examiner

*Primary Examiner*—Leo Boudreau
*Assistant Examiner*—Ishrat Sherali
(74) *Attorney, Agent, or Firm*—Blakely, Sokoloff, Taylor & Zafman LLP

(57) ABSTRACT

What is disclosed is an integrated color interpolation and color space conversion technique and apparatus. A raw image that is arranged in a Bayer pattern where each pixel has only one of the color components needed to form a full color resolution pixel may be converted using this technique directly to a XYZ space image without any intermediate conversion or interpolation steps. Specifically, in one instance, an 8-bit Bayer pattern raw image may be converted directly to a 24-bit XYZ space in a single pass approach. Such an integrated technique may more readily and inexpensively implemented in hardware such as on a digital camera, or in software.

15 Claims, 6 Drawing Sheets

MEDIAN COMPUTATION-BASED INTEGRATED COLOR INTERPOLATION AND COLOR SPACE CONVERSION METHODOLOGY FROM 8-BIT BAYER PATTERN RGB COLOR SPACE TO 24-BIT CIE XYZ COLOR SPACE

BACKGROUND OF THE INVENTION

1. Field of the Invention

The invention relates generally to the field of graphics. More specifically, the invention relates to the field of digital imaging systems and software.

2. Description of the Related Art

In some digital cameras and imaging devices, the color information of a scene is captured by sub-sampling an image typically into three (Red, Green and Blue) color planes. In such cases, the original "raw image" is captured with each "raw image pixel" composed of only one of three vital color/intensity components: either R, G, or B (Red, Green, or Blue). But for certain image rendering devices (such as a monitor or printer), full color resolution, wherein each pixel is composed of a combination of R, G and B components, is desirable. Recovery of full color information from a sub-sampled image of single-color component raw image pixels is popularly known as color interpolation.

In digital still and video cameras and certain other imaging devices, raw images are first represented as rectangular row and column of pixels with each pixel having the intensity value of a particular color plane only. In the case of RGB (Red, Green and Blue) sub-sampling imaging devices, images are obtained and stored in a particular pattern. FIG. 1(a) shows one such pattern, which is considered in describing the invention, known as the "Bayer" pattern. The Bayer pattern (see FIG. 1(a)), when three color planes are sub-sampled, is characterized by including on a first row of an image, alternating pixels of Red and Green, and then on a next row alternating pixels of Blue and Green. Thus, the Bayer pattern for the first four rows of pixels (with each pixel typically an 8-bit value) is as follows (with the rows thereafter repeating the same pattern):

G R G R G R . . .
B G B G B G . . .
G R G R G R . . .
B G B G B G . . .
•
•
•

As a result, each pixel location contains a value for a single color only. Assuming, as is the case in some imaging devices, that each pixel of the Bayer pattern has 8 bits of resolution (i.e., the pixel is a value representing at a particular location in the captured image the intensity of the color ranging from 0–255), then a "full colors" pixel, one having all three R, G and B components, would be a 24-bit value. To recover the two missing color components for each pixel, various methods of color interpolation or color recovery have been employed.

In color interpolation, an attempt is made to combine in some manner neighboring pixel(s) to reconstruct, recover, or predict missing color component information for a given raw image pixel. Several prior art interpolation methods are described in "*Interactions Between Color Plane Interpolation and Other Image Processing Functions in Electronic Photography*", James E. Adams, Jr., SPIE, (The International Society for Optical Engineering), Vol. 2416 (Electronic Imaging '95), pages 144–155 (July 1995), with most of these employing pixel averaging techniques to recover missing color components. One notable exception to averaging-type technique are techniques based upon the median computation. The median computation can be described as follows. Consider an ordered set of values $\{X_1, X_2, X_3 \ldots X_n\}$ such that $X_1 \leq X_2 \leq \ldots X_n$. The function median $\{X_1, X_2, X_3 \ldots X_n\}$ would return a value M such that one-half of the values in the set are ranked below that value and the other half are ranked above. Thus, if N is odd, then median $\{X_1, X_2, X_3 \ldots X_n\}$ is $$x_{\frac{N+1}{2}}$$

and if N is even, then median $\{X_1, X_2, X_3 \ldots X_n\}$ is the value $$\left(x_{\frac{N}{2}} + x_{\frac{N}{2}+1}\right)/2,$$

or the average of the two middle values in the rank ordered set. By definition, the median computation involves sorting. An unordered set of values will hereinafter be designated by "()" whereas an ordered set will be designated as "{}".

When used in color recovery/interpolation, the median computation is used to select a value that more or less is actually present in the neighborhood of the pixel under consideration. By contrast, averaging can have the effect of introduction a value of a color component that is not present. The median computation is one way therefore to reduce noise introduced through color interpolation.

A median technique would interpolate the Red component of the captured Green pixel at row 2, column 2, (referring to the 8-bit Bayer pattern above) as the median of the two nearest red pixels, i.e., Red pixel at row 1, column 2 and the Red pixel at row 3, column 2. In this case, since only two pixels are involved, the median computation reduces to a simple average without need for sorting. Likewise, the Blue component of the same captured Green at row 2, column 2 would be interpolated under an median technique as the median of the two nearest Blue pixels, i.e., the pixel at row 2, column 1 and the Blue pixel at row 2, column 3. The Blue and Red interpolated components are then combined with the original captured Green value of the pixel, row 2, column 2 to form a new pixel which is a composite "full" color pixel. The resultant "RGB" full color pixel is an approximation or prediction of the original object/one's true color at that location in the captured image. FIG. 1(a) illustrates that to store the color interpolated image, three times the memory size of the original Bayer pattern image, would be required, assuming that each color plane component, R, G and B retains the same number of bits after interpolation.

Once each pixel of the image is at a full RGB color resolution (either through color interpolation or by virtue of having been captured at full color resolution), another process known as color space conversion may be performed. Depending on the rendering device or particular application for which the full color image is destined, the RGB "color space" (of an interpolated image, see FIG. 1(a)) may need to be converted to a different color space. Certain imaging applications such as image editors or rendering devices such as printers may not use RGB color space in manipulating or rendering images. Instead they may use different color spaces which may have the advantage of being more standardized or better representative of the application/device nature and characteristics. The RGB color space primarily indicates the levels of R, G and B in a pixel location and thus is a measure of position in the color spectrum. An RGB color space image such as one resulting from color interpolating a Bayer pattern image also has both "chrominance" and "luminance" information although this information is not easily decodable. Luminance refers generally to the level of brightness in an image or pixel, whereas chrominance refers to the hue or placement of color in the color spectrum and saturation or intensity of that hue. In an RGB image, the Green color plane associated pixels contain most of the luminance information while Blue and Red associated pixels contain most of the chrominance information. This is due in part to the response of the human eye to recognize hue variations in the color Green over the colors Red and Blue, which are more associated in the human vision system with brightness or luminance levels. While a fully color interpolated RGB color space is excellent at representing the colors in an image, it is also dependent on the perception of what constitutes Red, Green, and Blue. Based on the responses of the human visual system to Red, Green, and Blue, a standardized color space has been defined known as CIE (Commission Internationale de l'Eclairage) XYZ.

CIE XYZ is a color system standardized by the CCIR (*International Consultative Committee on Broadcasting*) and is also referred to as the CCIR 601-1 color space. CIE XYZ defines color image information in terms of a first primary (Y component) and two other primary components X and Z. Any color can be represented by a combination of X, Y, and Z values. Roughly speaking, each component X, Y, and Z is a linear combination of the R, G, B primaries. In color space conversion from 24-bit RGB to 24 CIE XYZ, each pixel location has all three components X, Y, and Z. If each component is 8 bits in resolution, then each pixel has a total of 24 bits of information. FIG. 1(*b*) illustrates the processing step where the 24-bit RGB space is converted into a 24-bit CIE XYZ space. The CIE XYZ was developed in an attempt to eliminate dependence on how Red, Green and Blue are represented in one device as opposed to another. CIE XYZ removes, in part, dependence on device characteristics in representing color, and thus serves to standardizing the content of an image from one device to another.

Traditionally, the process of color interpolation and color space conversion have been independently performed. First, a raw image is color interpolated. When it is stored or transferred it may also be first compressed or encoded. The process of color space conversion ordinarily occurs in software or in an application separate from the imaging system performing the image capture. Often, even color interpolation is performed in software.

Color interpolation and color space conversion also both involve a set of computations. In the case of color interpolation, these computations may constitute equalweight averaging, according to one traditional color interpolation technique, of neighboring raw image pixels. In the case of color space conversion a transformation matrix is utilized to convert each pixel from an RGB color space value to an XYZ value. The transformation matrix is multiplied by the R,G and B values to generate X, Y and Z converted values.

It would be desirable to design and provide a technique that integrates the operation of color interpolation and color space conversion into a single operation. Such a technique would be advantageous in a digital camera where color interpolation is performed on-camera, such that color space conversion may also be performed in an integrated manner to reduce the overall computational complexity and time.

SUMMARY OF THE INVENTION

What is disclosed is a method including the steps of (1) providing an integrated median computation based color space conversion and color interpolation technique, and (2) applying that technique to pixels of a raw image, the raw image pixels without full color resolution, the technique generating therefrom a color interpolated image in a XYZ color space.

BRIEF DESCRIPTION OF THE DRAWINGS

The objects, features and advantages of the method and apparatus for the present invention will be apparent from the following description in which:

FIG. 1(*b*) shows 24-bit RGB to 24-bit CIE XYZ conversion according to prior art.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

In describing the invention, a pixel designated by Pij indicates an original raw image pixel value associated with color plane P (either R, G, or B) which resides at row "i" and column "j". The designation P'ij is a color interpolated/recovered value for the color plane P at row "i" and column "j".

Figure 2:
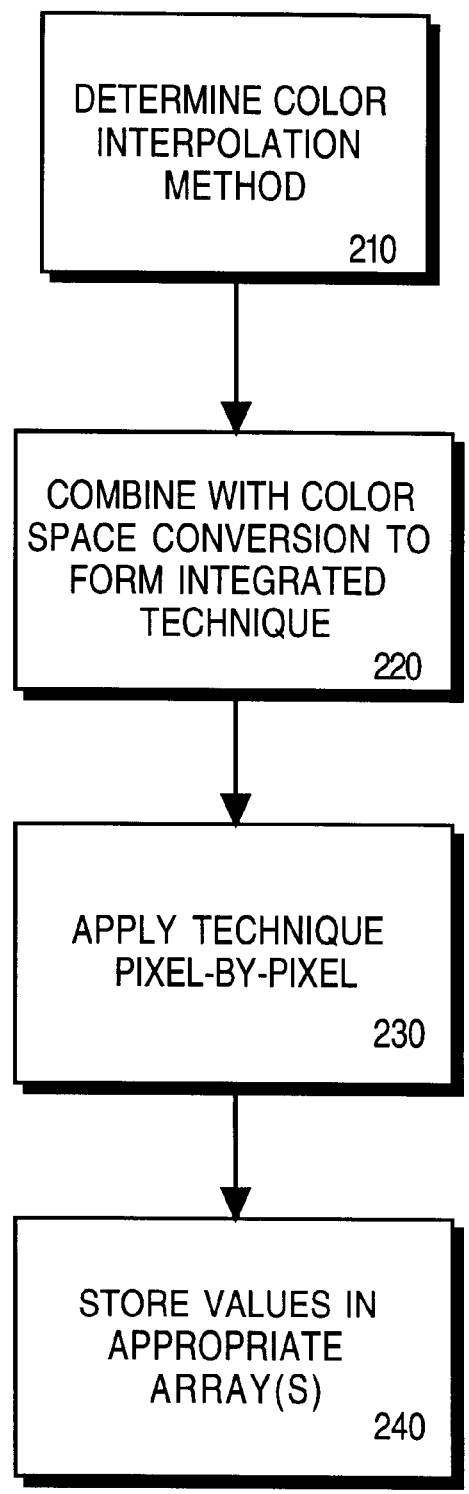
FIG. 2 is a flow diagram describing the basic methodology and design basis for at least one embodiment of the invention.

FIG. 2 is a flow diagram describing the basic methodology and design basis for at least one embodiment of the invention.

In imaging technology, there are many methods for color interpolation or recovery. When attempting to integrate the process of color space conversion with color interpolation, the color interpolation technique to be represented in the integrated technique should be compatible with the color space conversion process. One often used popular method of color interpolation is known as median computation based color interpolation. In such a method, a missing color component for a given pixel location is determined by determining the median of the adjacent and/or neighboring pixels that are also associated with that missing color. Referring to the Bayer pattern of FIG. 1(*a*), the pixel location (0,1) (row,column) of the raw image has the value R01 which is a Red color plane associated value. In the Bayer pattern, the Green color plane component and Blue color plane components are missing for location (0,1). To interpolate the Green color component G'01, one method of color interpolation would take the median of adjacent Green color plane associated pixel values which are, for instance, G00, G11 and G02. Likewise, the missing Blue color plane component B'01 (location (0,1)) would be interpolated as the median of adjacent Blue color plane associated pixel values B10 and B12, which can be reduced to the average (B10+B12)/2. Median computation techniques may also consider not only adjacent but neighboring non-adjacent pixels as well. Since there are many methods of color interpolation known in the art of imaging, a suitable one may be chosen for the application or implementation desired. Thus, according to step 210, in integrating color space conversion and color interpolation, a suitable color interpolation method should be determined. Then the interpolation method can be combined with a color space conversion technique (step 220).

For instance, when converting from the RGB color space to the CIE XYZ color space, a set of conversion equations are defined such that for a given pixel location (i,j) each component X, Y and Z is a linear combination of R, G and B components. One such set of equations is given below:

$$X_{i,j}=0.607*R_{i,j}+0.174*G_{i,j}+0.200*B_{i,j}$$

$$Y_{i,j}=0.299*R_{i,j}+0.587*G_{i,j}+0.114*B_{i,j}$$

$$Z_{i,j}=0.066*G_{i,j}+1.111*B_{i,j}$$

This set of equations generates for every RGB value(s) in a pixel location corresponding XYZ value(s) for that same pixel location. Color space conversion may be achieved using other coefficients than those given above which are merely exemplary of one conversion matrix used in the art. The above equations for RGB to XYZ conversion assumes that each pixel location already has a full color resolution, i.e., an R, G and B component. To proceed from the Bayer pattern raw image directly to the XYZ space, therefore, the color interpolation method chosen must be combined with color space conversion transform (step 220). If the same precision (i.e., number of bits) used to store the R, G and B values is used for the X, Y and Z values, then the total size of the storage needed for the XYZ space image would be the same as that needed for a full color RGB image. Thus, in an M by N image of 8-bit R, G and B values for each pixel, a total storage size of M*N*24 bits would be required. When RGB values are converted to a full resolution XYZ space, again the needed storage size would be M*N*24 bits (each pixel having 8-bit X, Y and Z values).

The integrated conversion described herein exemplifies application of the FIG. 2 methodology to derive a technique to convert directly an 8-bit per pixel Bayer pattern raw image into a full resolution XYZ color space. With an integrated technique, the need for duplicate computation and multiple passes is eliminated.

To combine color space conversion with color interpolation in this manner, a technique must be defined that combines the median computation of neighboring pixels for color interpolation and then converts simultaneously. The technique should be able to applied pixel-by-pixel (step 230) in a single pass. If successful, the 24-bit XYZ values can be stored directly into array(s) pixel-by-pixel (step 240) without need of intermediate RGB full color values. In the prior art, one pass-through is needed to color interpolate from an 8-bit Bayer pattern to 24-bit RGB full color, and then yet another pass-through of the image for the RGB to XYZ conversion. By integrating interpolation and color space conversion this multiple pass-through is avoided (FIGS. 1(a) and 1(b)).

Figure 3:
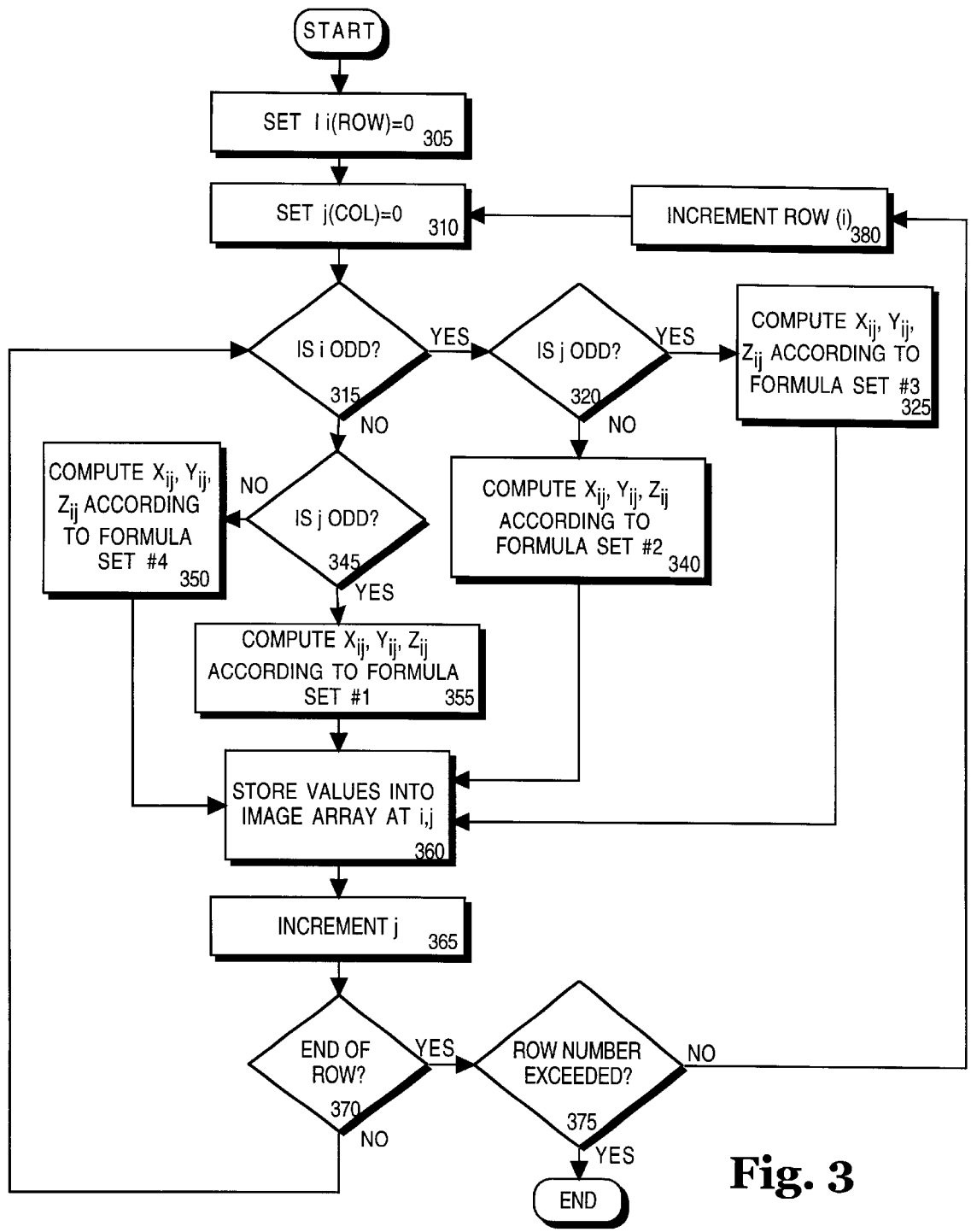
FIG. 3 is a flow diagram according to one embodiment of the invention.

FIG. 3 is a flow diagram according to one embodiment of the invention.

Figure 1A:
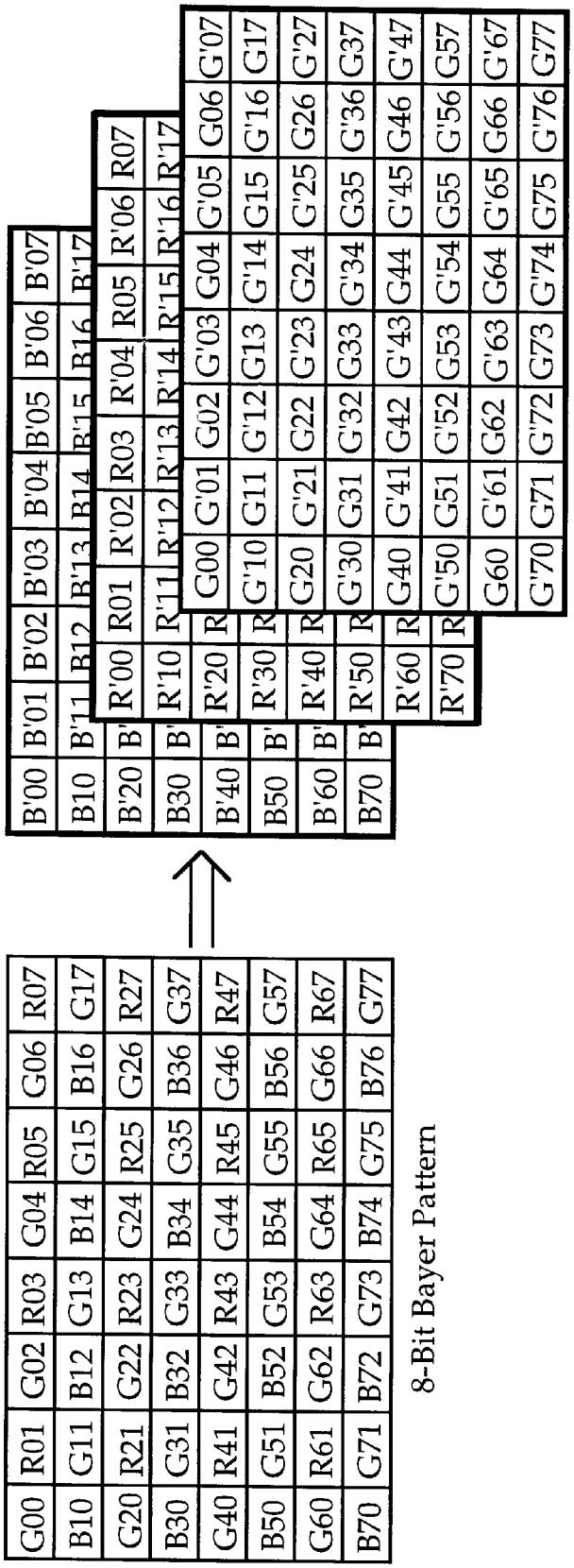
FIG. 1(*a*) shows 8-bit Bayer pattern RGB to 24-bit RGB conversion according to prior art.
Figure 1B:
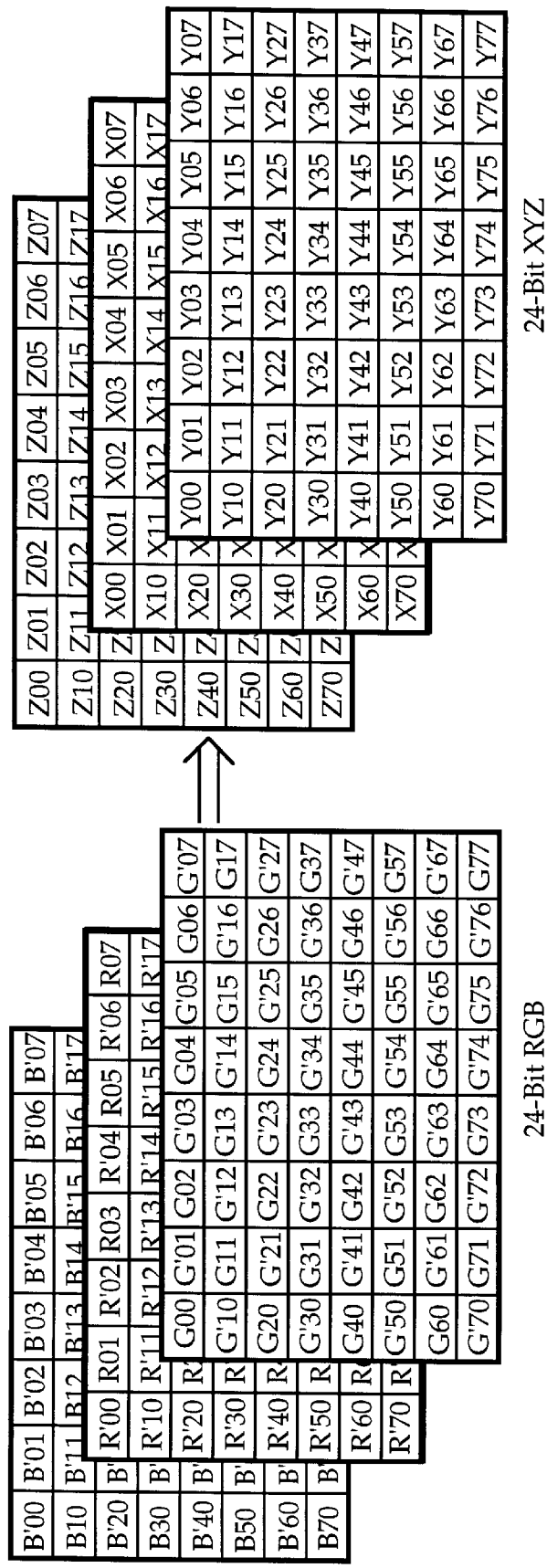

FIG. 3 shows that depending upon the row and column position of the pixel undergoing integrated conversion and interpolation, the formula or conversion algorithm employed will vary. This is due in large part to the repeating nature of the raw image in a Bayer pattern which has alternating rows and columns of pixels, each associated with certain color planes. Referring to FIG. 1(a), the first row of the Bayer pattern has pixels which in each column alternate between association with the Green and Red color planes. The next or second row of pixels alternate between the Blue and Green color planes. On the third row, the pattern is the same as the first row, and so on. When performing median computation based color interpolation, both the number and location of neighboring pixels utilized to derive missing color components varies. Given a pixel Pij (or $P_{i,j}$), where "i" represents the row number and "j" the column number and P the color plane association of that location in the original raw image Bayer pattern, the location (i,j), which is determinative of what color plane component is already present in the raw image pixel, determines how to extract the "set" i.e., the pixel values used in determining the median.

For example, referring to FIG. 1(a), the Red color plane associated pixel R43 is missing Green and Blue color plane components. The Green component G'43 for the location (4,3) in the image array can be determined in a median interpolation technique as the median of Green neighbors G33, G42, G44 and G53. Likewise, the Blue component B'43 for the location (4,3) in the image array may be interpolated as the median of B32, B34, B54 and B52. In this manner, the three color plane components R, G and B, will form the pixel location (4,3) in the color interpolated RGB space image. The above determination can be generalized such that for any Red color plane associated pixel Rij in the raw image Bayer pattern, the interpolated components are $$B'ij=median(B_{i-1,j-1}, B_{i-1,j+1}, B_{i+1,j+1}, B_{i+1,j-1}),$$

and $$G'ij=median(G_{i-1,j}, G_{i+1,j}, G_{i,j-1}, G_{i,j+1}).$$

Likewise, generalizations may be made for raw image pixels Bij such that:

for Bij, $G'ij=median(G_{i-1,j}, G_{i+1,j}, G_{i,j-1}, G_{i,j+1}),$ and $$R'ij=median(R_{i-1,j-1}, R_{i-1,j+1}, R_{i+1,j+1}, R_{i+1,j-1}).$$

For Gij, there are two possibilities. In a Bayer pattern, Green associated pixels either accompany a row along with Red color plane associated pixels or Blue color plane associated pixels. This dichotomy can be translated in terms of the nature of the coefficients "i" and "j" themselves. When "i" and "j" are both odd, for each such Gij, B'ij=median($B_{i,j-1}$, $B_{i,j+1}$) or ($B_{i,j-1}$, $B_{i,j+1}$)/2 and R'ij=median($R_{i-1,j}$, $R_{i+1,j}$) or ($R_{i-1,j}$, $R_{i+1,j}$)/2. When "i" and "j" are both even, for each such Gij, B'ij=median($B_{i-1,j}$,$B_{i+1,j}$) and R'ij=median ($R_{i,j-1}$, $R_{i,j+1}$). As noted above, the median of any two values ($X_1$, $X_2$) can also be expressed simply ($X_1$+$X_2$)/2.

Because Green color plane associated pixels actually represent chrominance information in the Bayer pattern, surrounding Green pixels are considered and an interpolation made even though the pixel is already Green. For any Green pixel, Gij, its Green component value is actually estimated/interpolated as:

$$G'_{ij}=\text{median}(G_{i-1,j-1},\ G_{i-1,j+1},\ G_{ij},\ G_{i+1,j-1},\ G_{i+1,j+1}).$$

The above generalized equations will interpolate missing and Green color components for the raw image pixels arranged in the Bayer pattern. When the raw image is in some other pattern, the above equations may be easily modified as needed by one of ordinary skill in the art. These deterministic equations for color interpolation can be combined algebraically with the XYZ color space conversion equations given above. Thus, for a location Rij in the Bayer pattern that already has a Red color plane associated component, Yij may be mapped as:

$$r=R_{i,j};$$

$$g=\text{median}(G_{i-1,j},G_{i+1,j},G_{i,j-1},G_{i,j+1});$$

$$b=\text{median}(B_{i-1,j-1},B_{i-1,j+1},B_{i+1,j-1},B_{i+1,j+1})$$

If each component $X_{ij}$, $Y_{ij}$ and $Z_{ij}$, have an 8-bit representation or precision, then each of the pixel locations will have 24 bits of information.

One advantage of an integrated color interpolation and color space conversion technique is the ability to eliminate the need for an extra processing step which does Bayer pattern to full color RGB interpolation When implemented in hardware, it advantageously avoids the need for a multiple-pass approach which must store the entire full color RGB image prior to obtaining the XYZ space image. Since there are in the original Bayer pattern image four different generalized equations for determining missing color components, the integrated technique is also split into four cases. Using algebraic substitution and effectually combining color space coefficients with averaging denominators, the following integrated technique may be obtained according to at least one embodiment of the invention:

("Row Numbers" refers to the maximum row number, while "Column Number" refers to the maximum column number. In an M by N image, RowNumber=M while ColumnNumber=N.

begin
    for (i=0 to RowNumber-1 && j=0 to ColumnNumber-1)
        case 1 (i is even and j is odd): [Formula set #1]

$$r=R_{i,j};$$

$$g=\text{median}(G_{i-1,j},G_{i+1,j},G_{i,j-1},G_{i,j+1});$$

$$b=\text{median}(B_{i-1,j-1},B_{i-1,j+1},B_{i+1,j-1},B_{i+1,j+1});$$

case 2 (i is odd and j is even): [Formula set #2]

$$r=\text{median}(R_{i-1,j-1},R_{i-1,j+1},R_{i+1,j-1},R_{i+1,j+1});$$

$$g=\text{median}(G_{i-1,j},G_{i+1,j},G_{i,j-1},G_{i,j+1});$$

$$b=B_{i,j};$$

case 3 (both i and j are odd): [Formula set #3]

$$r=(R_{i-1,j}+R_{i+1,j})/2;$$

$$g=\text{median}(G_{i-1,j-1},G_{i+1,j-1},G_{i,j},G_{i-1,j+1}G_{i+1,j+1});$$

$$b=(B_{i,j-1}+B_{i,j+1})/2;$$

case 4 (both i and j are even ): [Formula set #4]

$$r=(R_{i,j-1}+R_{i,j+1})/2;$$

$$g=\text{median}(G_{i-1,j-1},G_{i+1,j-1},G_{i,j},G_{i-1,j+1}G_{i+1,j+1});$$

$$b=(B_{i-1,j}+B_{i+1,j})/2;$$

end case:

$$X_{i,j}=0.607*r+0.174*g+0.200*b$$

$$Y_{i,j}=0.299*r+0.587*g+0.114*b$$

$$Z_{i,j}=0.066*g+1.111*b$$

end for
end.

The implementation of this four case technique is embodied in the flow diagram of FIG. 3. Due to the repeating nature of the Bayer pattern, the row and column position of the pixel location will indicate which of the four cases are applicable, and consequently, which formulas are to be utilized in determining the $X_{ij}$, $Y_{ij}$, and $Z_{ij}$ components for each pixel location.

In implementing the above technique, the row and column position indicators, "i" and "j" respectively, are first initialized to zero (steps 305 and 310) and incremented thereafter as appropriate. The position (0,0) indicates the upper left most pixel location in the image array (see FIG. 1(a)). If "i" is odd (checked at step 315) and "j" is not odd, i.e., even (checked at steps 315 and 320, respectively) then the $X_{ij}$, $Y_{ij}$, and $Z_{ij}$ component(s) are determined according to formula set #2 (step 340). If "i" is odd and "j" is odd (checked at steps 315 and 320, respectively), then components, $X_{ij}$, $Y_{ij}$, and $Z_{ij}$ must be determined according to formula set #3 (step 325).

If "i" is not odd, but even (checked at step 315), and if "j" is odd (checked at step 345), then $X_{ij}$, $Y_{ij}$, and $Z_{ij}$ are determined according to formula set #1 (step 355). If "i" is even and "j" is even, then $X_{ij}$, $Y_{ij}$, and $Z_{ij}$ are determined according to formula set #4 (step 350). In this manner, the three CIE XYZ space components —$X_{ij}$, $Y_{ij}$, and $Z_{ij}$—are determined for all pixel locations. Once the relevant component(s) for a pixel is/are determined, then the value(s) are stored into the appropriate image array (step 360). In one embodiment of the invention, the $X_{ij}$, $Y_{ij}$, and $Z_{ij}$ values are all stored in one array, while in another embodiment, these values are stored in their own separate arrays.

Once the values are stored, "j" or the column position, is incremented. If the end of the row is reached (checked at step 370) then the row position "i" is incremented (step 380) provided that the row number will not have exceeded the maximum row number (checked at step 375). After the row position is incremented, the column position "j" is reset to zero (step 310). This resets the start of a new row. If the end of the row is not reached, then the current pixel location is processed. In this manner, a row by row scanning and processing of pixels is achieved. For each pixel location in the image array, a single-pass is sufficient to convert to a XYZ space image. This single integrated technique can be implemented in hardware, software, firmware or a combination thereof.

By directly converting a Bayer pattern image into a XYZ format, the many intermediate steps when color interpolation and color space conversion are performed separately are avoided. Further, the need to temporarily store M*N*24 bits of information for an M*N image and then reaccess that storage for the multi-pass prior art approach is avoided.

Figure 4:
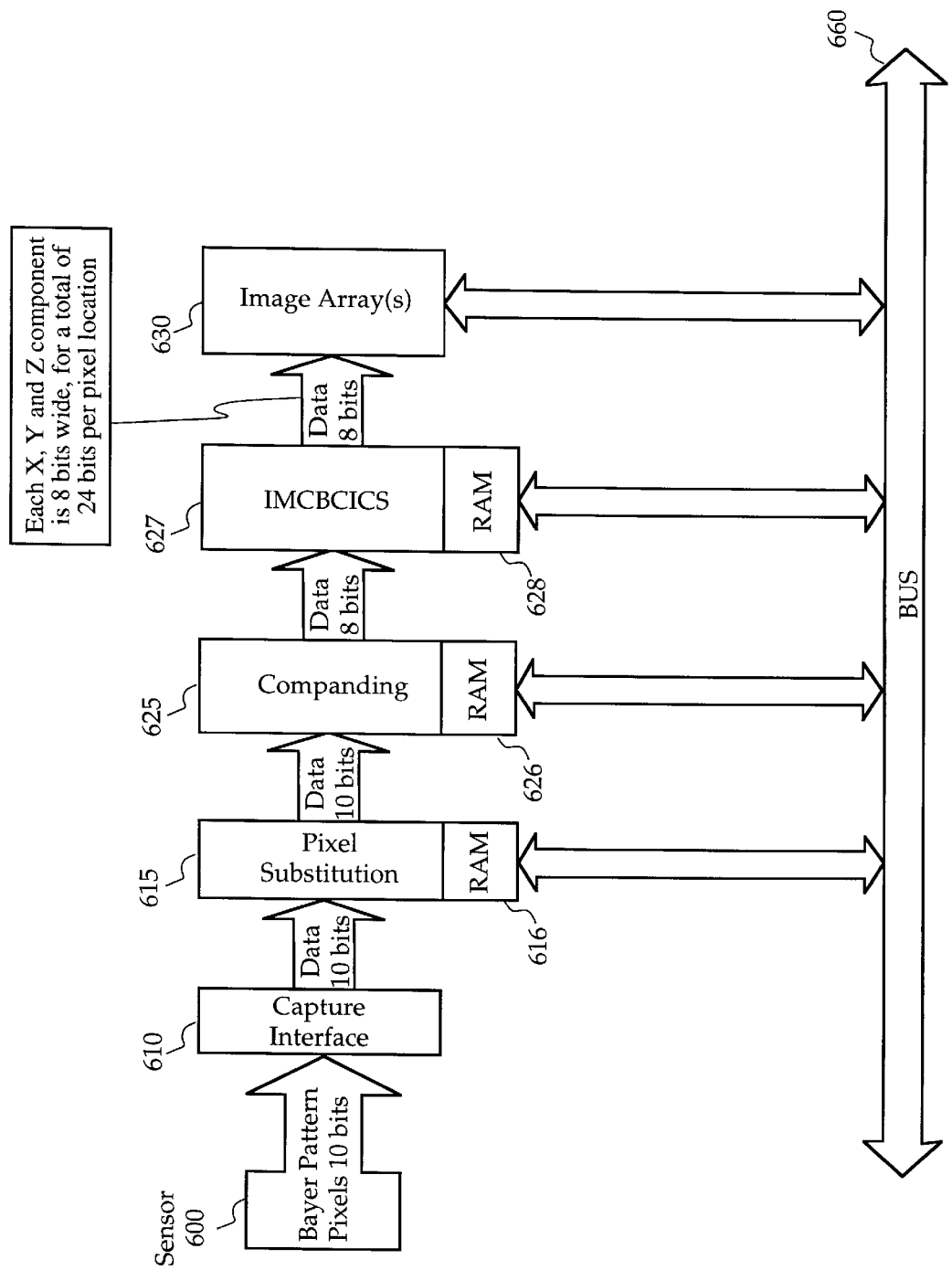
FIG. 4 is a block diagram of an image processing apparatus according to an embodiment of the invention.

FIG. 4 is a block diagram of an image processing apparatus according to an embodiment of the invention.

FIG. 4 is a block diagram of internal image processing and compression components of an imaging device incorporating at least one embodiment of the invention. In the exemplary circuit of FIG. 4, a sensor 600 generates pixel components which are color/intensity values from some scene/environment. The 10-bit pixel values generated by sensor 600 are sent to a capture interface 610. Sensor 600 in the context relating to the invention will typically sense one of either R, G, or B components from one "sense" of an area or location. Thus, the intensity value of each pixel is associated with only one of three color planes and may form together a Bayer pattern such as that shown in FIG. 1(a). Capture interface 610 resolves the image generated by the sensor and assigns values to the individual pixels. The set of all such pixels for the entire image is in a Bayer pattern in accordance with at least one of the embodiments of the invention.

It is typical in any sensor device that some of the pixel cells in the sensor plane may not respond to the lighting condition in the scene/environment properly. As a result, the pixel values generated from these cell may be defective. These pixels are called "dead pixels." The "pixel substitution" unit 615 replaces each dead pixel by the immediate previously valid pixel in the row.

A RAM table 616 consists of the row and column indices of the dead pixels, which are supplied by the sensor. This RAM table 616 helps to identify the location of dead pixels in relation to the captured image. Companding module 625 is circuit designed to convert each original pixel of 10-bit intensity captured from the sensor to an 8-bit intensity value. Companding module 625 is not needed if the sensor 600 and capture interface 610 provide an 8-bit per-pixel value.

According to at least one embodiment of the invention, as described above, the 8-bit value for each pixel may be directly converted (after companding) from its Bayer pattern single color component form (R, G and B) into a 24-bit XYZ space image. This integrated technique may be implemented as hardware as shown in FIG. 4. An integrated median computation based color interpolation and color space conversion module (IMCBCICS) 627 is coupled to companding module 625 and can receive therefrom 8-bit pixel data values. Each 8-bit value can be converted directly (after suitable delay to obtain the necessary neighboring component values) by module 627 into either X, Y, and Z components as appropriate. Since the integrated technique envisions differing formulas depending on the position of the pixel in the image array, flip-flops and other such state change mechanisms may be provided in module 627. A set of two flip-flops, one indicating row position and another indicating column position can be used to track whether a pixel lies on an even or odd row or column. Accordingly, these control signals and state signals may be used in selecting appropriate coefficients as specified by the formula sets #1 through #4 described above. Also, RAM table 628 can be used to store coefficients for each formula or to store neighboring pixel values needed in executing the integrated technique. For example, formula set #2 generates the Z component by utilizing 4 neighboring G color plane pixels and the input pixel Bij. As input pixels are received by module 627, they can be stored temporarily in RAM table 628 and flushed after the component(s) value has been utilized in the computation formulas for which they are required. Thus, module 627 will also consist of Read/Write logic that will facilitate the storage and retrieval of pixel values as desired. Further, add and multiply units can be provided in module 627 to carry out at least some of the necessary computations.

To perform the sorting operation needed for determining the median, a set of comparators and programmable registers may be employed. The registers can form a queue whose entries are reordered based on the output of the comparators. Module 627 can be designed to provide three sets of outputs (one for each X, Y and Z component) for each pixel location. These outputs, which represent the 24-bit XYZ space image component values, can be written to at least one image array(s) 630. Even though certain neighboring pixel values must be read in prior to be able to provide valid outputs, the module 627 will only need to traverse the Bayer pattern once. By storing component values and flushing them after they are no longer needed for any further computation, multiple passes through the Bayer pattern is avoided. In designing module 627, a RAM table 628 would need only to store, for each row of pixels being sensed and then converted, a maximum of two other rows of pixels.

A RAM table 626 may accompany companding module 625 and be used to look up, for each 10-bit value, a corresponding 8-bit mapped value. Thus, each pixel in the Bayer pattern will become an 8-bit value, associated with one of the three color planes.

Each of the RAM tables 616, 626 and 628 can directly communicate with bus 660 so that their data can be loaded and then later, if desired, modified. Further, those RAM tables and other RAM tables may be used to store scaled image data or intermediate result data as needed. Though the individual components (selectors, shifters, registers, add, multiply units and control/address signals) of module 627 have not been detailed, one skilled in the art will readily be able to implement such a device, following the logic of the flow diagram set forth in FIG. 3.

Figure 5:
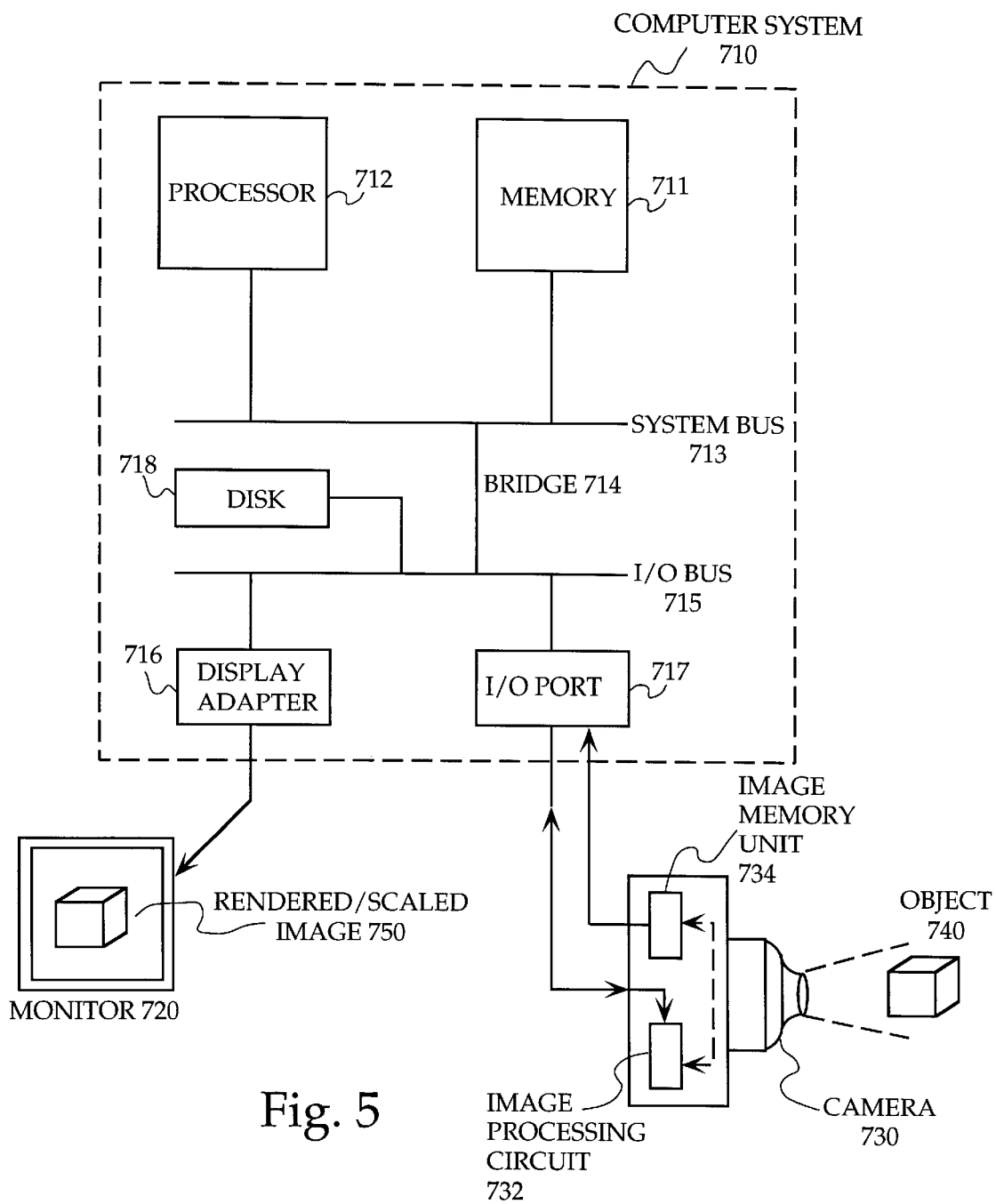
FIG. 5 is a system diagram of one embodiment of the invention.

FIG. 5 is a system diagram of one embodiment of the invention.

Illustrated is a computer system 710, which may be any general or special purpose computing or data processing machine such as a PC (personal computer), coupled to a camera 730. Camera 730 may be a digital camera, digital video camera, or any image capture device or imaging system, or combination thereof and is utilized to capture an image of an object/scene 740. Essentially, captured images are processed by an image processing circuit 732 so that they can be efficiently stored in an image memory unit 734, which may be a ROM, RAM or other storage device such as a fixed disk. The image contained within image memory unit 734 that is destined for computer system 710 can be according to one embodiment of the invention, stored directly as a 24-bit XYZ space image as opposed to an 24-bit color interpolated RGB image space. In most digital cameras that can perform still imaging, images are stored first and downloaded later. This allows the camera 730 to capture the next object/scene quickly without additional delay. The invention in its various embodiments, particularly in providing a 24-bit XYZ space image that is directly converted from the captured 8-bit Bayer pattern, reduces the computation requirements of the camera 730 and the associated costs allowing for a more inexpensive camera. Further, in imaging applications where it is known a priori that XYZ format is desired, the image can be directly downloaded from camera 730 without modification or further processing.

The image processing circuit 732 carries out the integrated median computation based color interpolation and color space conversion directly from the Bayer pattern sense (with other intermediate steps such as pixel substitution or companding, see FIG. 4 and associated description) of camera 730 in this embodiment of the invention. When a color space converted and interpolated image is downloaded to computer system 710, it may be rendered to some output device such as a printer (not shown) or to a monitor device 720. If, according to one embodiment of the invention, the image is in 24-bit XYZ format, it may need to be converted back to an RGB format. Conversion of the XYZ image may be achieved using a processor 712 such as the Pentium® (a product of Intel Corporation) and a memory 711, such as RAM, which is used to store/load instruction addresses and result data and is a well-known operation in the art of colorimetry.

In an alternate embodiment, the integrated color space conversion and color interpolation described above may be achieved in a software application running on computer system 710 rather than directly in camera 730. In such an embodiment, the image processing circuit may advantageously store only the 8-bit Bayer pattern image. The application(s) used to perform the integrated color interpolation and color space conversion after down load from camera 730 may be from an executable compiled from source code written in a language such as C++. The instructions of that executable file, which correspond with instructions necessary to scale the image, may be stored to a disk 718 or memory 711. Further, such application software may be distributed on a network or a computer-readable medium for use with other systems. It would be readily apparent to one of ordinary skill in the art to program a computing machine to perform integrated color space conversion and color interpolation upon an image if the methodology described above is followed. Further, the various embodiments of the invention may be implemented onto a video display adapter or graphics processing unit that provides color space conversion and color interpolation in an integrated single step as described above.

When an image, such as an image of a scene 740, is captured by camera 730, it is sent to the image processing circuit 732. Image processing circuit 732 consists of ICs and other components which execute, among other functions, the integrated median computation based color interpolation and color space conversion of an image. The scaling operation, as described earlier, may utilize image memory unit to store the 24-bit XYZ space image that results from the processing. Once all pixels are processed and transferred to the computer system 710 for rendering, the camera 730 is free to capture the next image. When the user or application desires/requests a download of images, the imaged stored in the image memory unit, whether stored as XYZ space images or as Bayer pattern images, are transferred from image memory unit 734 to the I/O port 717. I/O port 717 uses the bus-bridge hierarchy shown (I/O bus 715 to bridge 714 to system bus 713) to temporarily store the XYZ color space image data into memory 711 or, optionally, disk 718. Computer system 710 has a system bus 713 which facilitates information transfer to/from the processor 712 and memory 711 and a bridge 714 which couples to an I/O bus 715. I/O bus 715 connects various I/O devices such as a display adapter 716, disk 718 and an I/O port 717, such as a serial port. Many such combinations of I/O devices, buses and bridges can be utilized with the invention and the combination shown is merely illustrative of one such possible combination.

In one embodiment of the invention, the XYZ space images can converted back to full resolution RGB space on computer system 712 by suitable application software (or hardware), which may utilize processor 712 for its execution. The full resolution RGB image data may then be rendered visually using a display adapter 716 into a rendered/scaled image 750. Since color interpolation and color space conversion are readily facilitated on-camera in one embodiment of the invention, it may be possible to implement a communication port in camera 730 that allows the image data to be transported directly to the other devices.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than restrictive.

What is claimed is:

1. A method comprising:

providing an integrated color interpolation and color space conversion technique, said technique including determination of a missing color component for a pixel location by determining a median of adjacent pixels associated with the same color of said missing color component and integrating the operation of color interpolation and color space conversion into a single operation; and applying said technique to pixels of a raw image, said raw image pixels without full color resolution, said technique generating therefrom a color interpolated image in a XYZ color space.

2. A method according to claim 1 wherein said raw image pixels are arranged in a Bayer pattern.

3. A method according to claim 2 wherein said technique varies in operation according to a row and column position of said pixels in said raw image.

4. A method according to claim 3 wherein each said pixel of said raw image is 8-bits in precision and wherein each of said X, Y and Z components is also of 8-bit precision.

5. An apparatus comprising:

an integrated color interpolation and color space conversion module configured to convert a raw image into an image of a XYZ color space by a technique including determination of a missing color component for a pixel location by determining a median of adjacent pixels associated with the same color of said missing color component and integrating the operation of color interpolation and color space conversion into a single operation; and a memory coupled to said module, said memory configured to store and provide pixel values required by said module during its operation.

6. An apparatus according to claim 5 wherein said module is configured to convert a Bayer pattern input image into said 24-bit XYZ image.

7. An apparatus according to claim 5 further comprising an image capture mechanism coupled to said module, said image capture mechanism configured to provide an image of a scene in a Bayer pattern of pixels.

8. An apparatus according to claim 7 further comprising a companding module to reduce to suitable precision values associated with said pixels generated by said capture mechanism.

9. An apparatus according to claim 6 further comprising image arrays, said image arrays configured to store separtely sets of X, Y and Z components.

10. An apparatus according to claim 5 configured to be embedded in a digital image capture device.

11. An imaging device comprising:

an image processing circuit, said image processing circuit configured to perform integrated color interpolation and color space conversion of a raw image captured by said imaging device as a technique to generate a XYZ color space image, said technique including determination of a missing color component for a pixel location by determining a median of adjacent pixels associated with the same color of said missing color component and integrating the operation of color interpolation and color space conversion into a single operation.

12. An imaging device according to claim 11 wherein said integrated median computation based color interpolation and color space conversion generates from said raw image, an XYZ color space image.

13. An imaging device according to claim 11 further comprising an image memory unit coupled to said image processing circuit, said image memory unit configured to store said color interpolated and color space converted images.

14. An imaging device according to claim 13 configured to be tethered to a computer system, said computer system configured to download said color interpolated and color space converted images.

15. An imaging device according to claim 14 wherein said computer system is additionally configured to render said color interpolated and color space converted images to an output device.

* * * * *

UNITED STATES PATENT AND TRADEMARK OFFICE
CERTIFICATE OF CORRECTION

PATENT NO. : 6,366,692 B1 Page 1 of 1
DATED : April 2, 2002
INVENTOR(S) : Acharya It is certified that error appears in the above-identified patent and that said Letters Patent is hereby corrected as shown below:

<u>Column 1,</u>
Line 55, delete "colors", insert -- color --.

Signed and Sealed this

Twenty-seventh Day of August, 2002

Attest:

Attesting Officer

JAMES E. ROGAN
*Director of the United States Patent and Trademark Office*